United States Patent
Komori et al.

(10) Patent No.: US 7,507,029 B2
(45) Date of Patent: Mar. 24, 2009

(54) TAPERED ROLLER BEARING ASSEMBLY FOR SUPPORTING VEHICLE WHEEL

(75) Inventors: Kazuo Komori, Iwata (JP); Akitoshi Imou, Iwata (JP)

(73) Assignee: NTN Corporation, Osaka (JP)

( * ) Notice: Subject to any disclaimer, the term of this patent is extended or adjusted under 35 U.S.C. 154(b) by 289 days.

(21) Appl. No.: 10/556,468

(22) PCT Filed: May 10, 2004

(86) PCT No.: PCT/JP2004/006241

§ 371 (c)(1),
(2), (4) Date: Nov. 10, 2005

(87) PCT Pub. No.: WO2004/101295

PCT Pub. Date: Nov. 25, 2004

(65) Prior Publication Data

US 2007/0031079 A1 Feb. 8, 2007

(30) Foreign Application Priority Data

May 15, 2003 (JP) .............................. 2003-137078

(51) Int. Cl.
*F16C 33/58* (2006.01)
(52) U.S. Cl. .................... 384/589; 384/571; 384/564
(58) Field of Classification Search ................. 384/571, 384/589, 459, 564
See application file for complete search history.

(56) References Cited

U.S. PATENT DOCUMENTS

| | | | | |
|---|---|---|---|---|
| 2,274,218 A | * | 2/1942 | Scribner | ..................... 384/459 |
| 2,977,138 A | * | 3/1961 | Brittain, Jr. | .................. 277/552 |
| 4,136,916 A | | 1/1979 | Musselman et al. | |
| 5,259,676 A | | 11/1993 | Marti | |
| 6,280,093 B1 | | 8/2001 | Ohtsuki | |
| 2001/0016092 A1 | | 8/2001 | Komaba et al. | |
| 2002/0064327 A1 | | 5/2002 | Toda et al. | |

FOREIGN PATENT DOCUMENTS

| | | |
|---|---|---|
| JP | 56-119015 | 2/1955 |
| JP | 62-37619 | 3/1987 |
| JP | 2000-065049 | 3/2000 |
| JP | 2000-211310 | 8/2000 |
| JP | 2002-206538 | 7/2002 |
| JP | 2003-056570 | 2/2003 |

\* cited by examiner

*Primary Examiner*—Thomas R Hannon

(57) ABSTRACT

To provide a tapered roller bearing assembly for supporting a vehicle wheel, in which stress concentration in the vicinity of a collar adjacent a hub flange is lessened to improve the durability, the assembly includes an outer member (1) having a plurality of tapered rolling faces (1*a*), an inner member (2) having a corresponding number of tapered rolling faces (2*a*), a corresponding number of rows of tapered rollers (4). The inner member (2) includes a hub axle (3) with a hub flange (10) adjacent an outboard end, and a single row inner race (5) mounted externally on an inboard end of the hub axle (3). The rolling faces (2*a*) are formed on the hub axle (3) and the single row inner race (5). A collar ring (6) in contact with the large ends of the tapered rollers (4) of the outboard row is provided as a flange ring (6) separate from the hub axle (3) and fitted on the hub axle (3) at a position adjacent the hub flange (10).

2 Claims, 3 Drawing Sheets

TAPERED ROLLER BEARING ASSEMBLY FOR SUPPORTING VEHICLE WHEEL

This application claims the benefit of PCT International Application Number PCT/JP2004/006241 filed May 10, 2004 and Japanese Application No. 2003-137078, filed May 15, 2003, in Japan, the disclosures of which are incorporated herein by reference.

FIELD OF THE INVENTION

The present invention generally relates to a tapered roller bearing assembly of a hub unit type for rotatably supporting a vehicle wheel and, more particularly, to the wheel support bearing assembly for use in full-size trucks, station wagons and estate cars.

BACKGROUND ART

As a wheel support bearing assembly, a hub unit type tapered roller bearing assembly (of a third generation model) such as shown in FIG. 3 of the accompanying drawings has hitherto been known. The bearing assembly shown in FIG. 3 includes a plurality of circumferentially extending rows of tapered rollers 24 interposed between an outer member 21 and an inner member 22, in which the inner member 22 is comprised of a hub axle 23 and an inner race 25 for one of the circumferential rows of the tapered rollers 24. The hub axle 23 and the inner race 25 has rolling faces 22a defined therein for those circumferential rows of the tapered rollers 24. The hub axle 23 is formed with a large collar 22b adjoining the adjacent rolling face 22a for engagement with a large diameter end of each of the tapered rollers 24. A junction between the rolling face 22a and the large collar 22b is formed with a small machining recess 22c.

It is also to be noted that in the single row tapered roller bearing assembly, an example, in which the large collar on the side of an outer race is divided, is disclosed in the U.S. Pat. No. 4,136,916.

When the conventional bearing assembly of the type discussed above is used in association with a full-size truck, and in the event that a moment load is loaded, an excessive tensile stress develops in the grinding recess in the large collar employed in the hub axle 23. For this reason, a fatigue is apt to occur in a portion of the bearing assembly adjacent the machining recess 22c, making it difficult to improve the durability.

DISCLOSURE OF THE INVENTION

The present invention is intended to provide a tapered roller bearing assembly for supporting a vehicle wheel, in which stress concentration tending to occur in the vicinity of the large collar adjacent a flange in the hub axle is lessened to increase the durability of the bearing assembly.

A tapered roller bearing assembly for supporting a vehicle wheel according to a first aspect of the present invention includes an outer member having an inner peripheral surface formed with a plurality of tapered rolling faces with their reduced diameter end sides being close to each other, an inner member having a corresponding number of tapered rolling faces confronting those tapered rolling faces in the outer member, and a corresponding number of rows of tapered rollers interposed between the tapered rolling faces in the inner member and the tapered rolling faces in the outer member, respectively. The inner member referred to above includes a hub axle having an outer periphery formed with a hub flange defined therein at a location adjacent an outboard end of the hub axle, and a single row inner race mounted externally on an inboard end of the hub axle. The hub axle and the single row inner race are formed with respective rolling faces which form the plurality of rolling faces for the plural rows referred to above. The single row inner race has a large collar defined therein at a location adjacent an inboard end thereof. In the bearing assembly of this construction, a collar ring is mounted on a portion of the outer periphery of the hub axle adjacent the hub flange for engagement with a large diameter end of each of the tapered rollers of the outboard row.

According to the present invention, the collar provided in the vicinity of the rolling face adjacent the hub flange of the hub axle is formed as a collar ring separated from the hub axle and this separate collar ring is mounted externally on the hub axle. Therefore, stress concentration, tending to occur due to the load imposed by the tapered rollers at a boundary between the rolling face of the hub axle and a surface of the collar, can be lessened. Thus, even though the bearing assembly of the present invention is used in association with a kind of vehicles having a heavy weight, the fatigue hardly occurs in the boundary referred to above, rendering the bearing assembly of the present invention robust.

In the present invention, a collar ring mounting area of a cylindrical configuration may be provided in a portion of the hub axle on an inner side of the hub flange, and an arcuately sectioned surface area may also be provided which is continued from the collar ring mounting area to a side face of the hub flange, may be provided. The collar ring may include a cylindrical inner peripheral surface area held in contact with the collar ring mounting area, an end face held in abutment with the side face of the hub flange, and a non-contact inner peripheral surface area defined therein at a location between the end face and the cylindrical inner peripheral surface area and held in non-contact relation with the arcuately sectioned surface area.

In the case of this construction, since the arcuately sectioned surface area lying from the collar ring mounted area to the side face of the hub flange has a large radius of curvature, the stress concentration loaded on that portion through the tapered rollers can further be lessened.

In the present invention, an outer peripheral surface of the collar ring may be formed as a stepped cylindrical outer peripheral surface having a large diameter portion on one side adjacent the hub flange and a reduced diameter portion on the other side. A sealing member fitted to an inner peripheral surface of the outer member may be slidingly engaged with the reduced diameter portion of this outer peripheral surface. Alternatively, a seal contact ring may be mounted on the reduced diameter portion of the outer peripheral surface with the sealing member slidably contacted therewith.

In the case of this construction, in spite of the use of the separate collar ring, the outboard sealing member between the outer member and the inner member can be arranged with high space efficiency. For this reason, it is possible to use the collar ring of a sufficient size for given bearing dimensions to achieve excellent durability and, also, the sealability can be secured.

In the tapered roller bearing assembly for supporting the vehicle wheel according to another aspect of the present invention is featured in that a collar engageable with the large diameter end of each of the tapered rollers of the outboard row is provided in the outer member instead of the inner member. The structure that provides the basis for this feature is similar to the tapered roller bearing assembly for supporting the vehicle wheel according to the first aspect of the present invention. Namely, the structure includes an outer member having an inner peripheral surface formed with a plurality of tapered rolling faces with their reduced diameter end sides being close to each other, an inner member having a corresponding number of tapered rolling faces confronting those tapered rolling faces in the outer member, and a corresponding number of rows of tapered rollers interposed between the tapered rolling faces in the inner member and the tapered rolling faces in the outer member, respectively. The inner member referred to above in turn includes a hub axle having an outer periphery formed with a hub flange defined therein at a location adjacent an outboard end of the hub axle, and a single row inner race is mounted externally on an inboard end of the hub axle. The hub axle and the single row inner race being formed with respective rolling faces which form the rolling faces for the plurality of the tapered rolling faces referred to above. The single row inner race has a large collar defined therein at a location adjacent an inboard end thereof; and a collar ring is mounted on a portion of the outer periphery of the hub axle adjacent the hub flange for engagement with a large diameter end of each of the tapered rollers of the outer row.

In the case of this construction, since the hub axle has no collar that continues to the rolling face on the outboard side, the outer peripheral surface of the hub axle can have a shape smoothly continuing from the rolling face on the outboard side towards the hub flange, with the stress concentration lessened consequently. For this reason, there is no increase of the fatigue resulting from the stress concentration and the wheel support bearing assembly excellent in durability can be obtained. Though the outer member is provided with the collar, a problem associated with the stress concentration is minimal since the outer member 11 is on a fixed side.

BEST MODE FOR CARRYING OUT THE INVENTION

Figure 1:
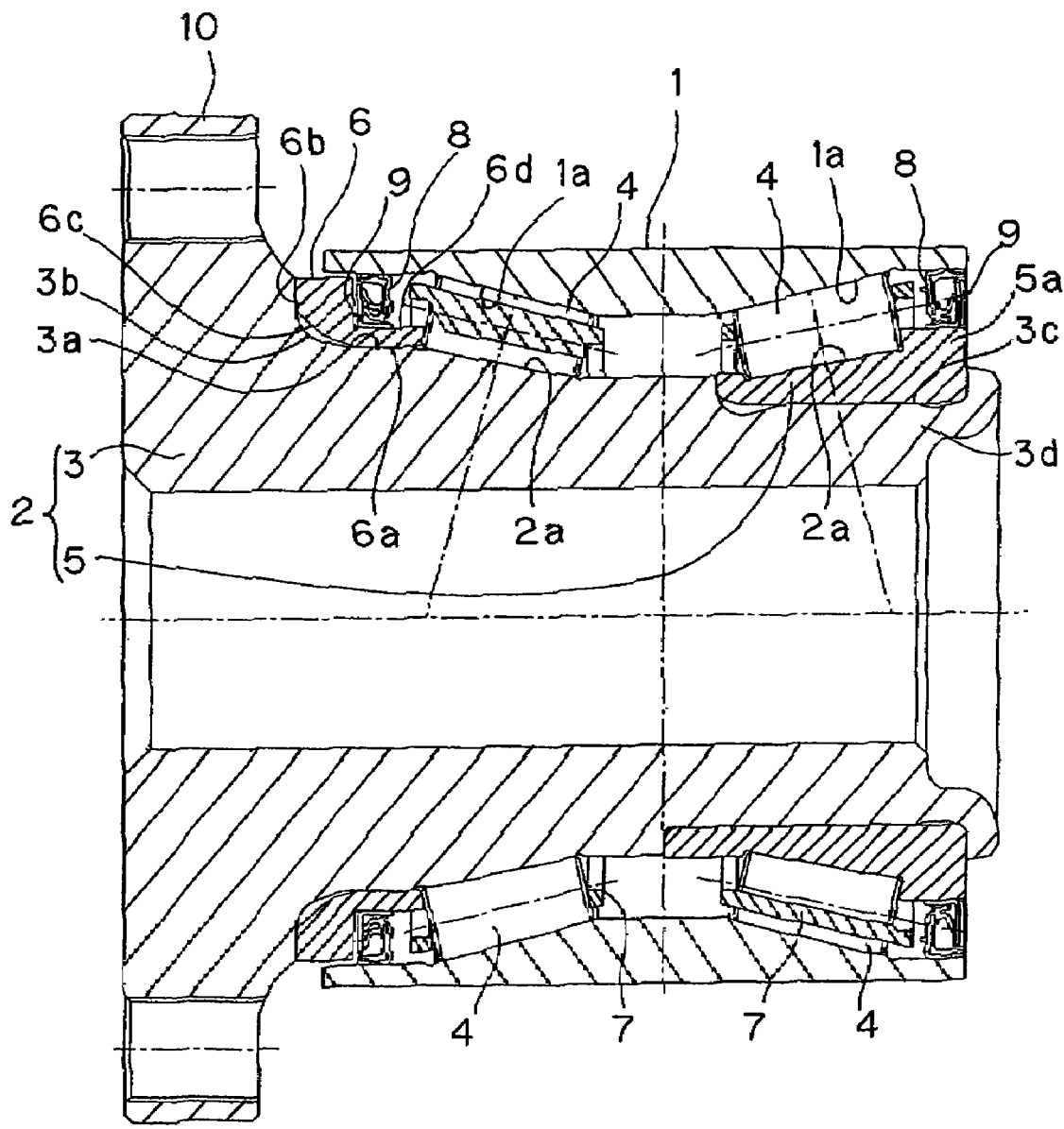
FIG. 1 is a longitudinal sectional view of a tapered roller bearing assembly for supporting a vehicle wheel according to a first preferred embodiment of the present invention.

Referring to FIG. 1 showing a first preferred embodiment of the present invention, a tapered roller bearing assembly for supporting a vehicle wheel shown therein is a dual row tapered bearing model of a hub unit type. This wheel support bearing assembly includes an outer member 1 having an inner periphery formed with dual rows of tapered rolling faces 1a, in which reduced diameter ends adjoin with each other, an inner member 2 having an outer periphery formed with tapered rolling faces 2a confronting the rolling faces 1a, and dual rows of tapered rollers 4 interposed between the rolling faces 1a in the outer member 1 and the rolling faces 2a in the inner member 2. The tapered rollers 4 are retained by a roller retainer 7 employed for each of the rows of the tapered rollers 4. The outer member 1 is provided at its opposite ends with sealing members 8, respectively, for sealing an annular space delimited between the inner and outer members 2 and 1.

The inner member 2 is made up of a hub axle 3 having a hub flange 10 formed at an outboard end thereof, and a single row inner race 5 mounted on an inboard end of the hub axle 3, with the rolling faces 2a defined in the hub axle 3 and the single row inner race 5, respectively. A collar ring 6 is mounted on a portion of the outer periphery of the hub axle 3 adjacent the hub flange 10 for engagement with large diameter ends of each of the tapered rollers 4 of the outboard row. A tire wheel is fixedly mounted on the hub flange 10 by means of bolts (not shown) extending through holes defined in the hub flange 10 in a direction circumferentially of the latter.

Where the illustrated wheel support bearing assembly is used for supporting a vehicle drive wheel, the hub axle 3 is coupled with one end of a constant velocity universal joint, for example, a joint outer race, while the other end (i.e., a joint inner race) of the constant velocity universal joint is connected to a drive axle.

The inboard end of the hub axle 3 has an inner race mounting area 3c defined on the outer peripheral surface thereof, and the single row inner race 5 is mounted on the inner race mounting area 3c. The single row inner race 5 includes a large collar 5a defined in an inboard end thereof, the large collar 5a having a side face with which the large diameter ends of the tapered rollers 4 of the inboard row are engageable. A seal contact ring 9, with which the sealing member 8 secured to an inner peripheral surface of the outer member 1 is slidingly engageable, is fixedly mounted on an outer periphery of the large collar 5a. This sealing member 8 may alternatively engage directly with the outer peripheral surface of the large collar 5a on the single row inner race 5. A portion of the inboardmost end of the single row inner race 5 is rendered to be a crimped portion 3d so crimped radially outwardly to urge an annular end face of the single row inner race 5 and, by means of this crimped portion 3, the singe row inner race 5 is axially fixedly fastened.

A portion of the outer peripheral surface of the hub axle 3 on an inboard side of the hub flange 10 has a collar ring mounting area 3a of a cylindrical configuration defined therein, and from this collar ring mounting area 3a, an arcuately sectioned surface area 3b continued to a side face of the hub flange 10 is formed. A collar ring 6 is mounted on this collar ring mounting area 3a and includes a cylindrical inner peripheral surface area 6a held in contact with the collar ring mounting area 3a of the hub axle 3, an end face 6b held in abutment with the side face of the hub flange 10, and a non-contact inner peripheral surface area 6c defined in the collar ring 6 at a location between the end face 6b to the cylindrical inner peripheral surface area 6a and held in non-contact relation with the arcuately sectioned surface area 3b. An outer peripheral surface of the collar ring 6 is formed as a stepped cylindrical outer peripheral surface having a large diameter on one side adjacent the hub flange 10. A seal contact ring 9, with which the sealing member 8 fitted to the inner peripheral surface of the outer member 1 is slidingly engageable, is provided on a reduced diameter portion 6d of this outer peripheral surface. The sealing member 8 may alternatively be caused to slidably engage directly with the reduced diameter portion 6d of the outer peripheral surface of the collar ring 6.

According to the foregoing construction, the collar provided in the neighbor of the rolling face 2a adjacent the hub flange 10 of the hub axle 3 is formed as a collar ring 6 separate from the hub axle 3 and this separate collar ring 6 is mounted externally on the hub axle 3 and, therefore, stress concentration, tending to occur at a boundary between the rolling face 2a of the hub axle 3 and a surface of the collar as a result of contact with the tapered rollers 4, can be lessened. Accordingly, even though the bearing assembly of the present invention is used in association with a kind of vehicles having a heavy weight, the fatigue hardly occurs in the boundary referred to above, rendering the bearing assembly of the present invention robust.

Also, since the outer peripheral surface of the hub axle 3 is provided with the arcuately sectioned surface area 3*b* having a large radius of curvature and continuing from the collar ring mounting area 3*a* to the side face of the hub flange 10 and the collar ring 6 has the non-contact inner peripheral surface area 6*c* that establishes a non-contact relation with the arcuately sectioned surface area 3*b*, stress concentration brought about by the load loaded on this portion from the row of the tapered rollers 4 on an outboard side and through the collar ring 6 can further be lessened.

In addition, since the outer peripheral surface of the collar ring 6 is formed as the stepped cylindrical surface and the sealing member 8 secured to the outer member 1 is made to slidingly engage with the reduced diameter portion 6*d* of this stepped outer peripheral surface, even though the collar ring 6 separate from the hub axle 3 is employed, the outboard sealing member 8 between the outer member 1 and the inner member 2 can be arranged with high space efficiency or high efficiency of utilization of the space. For this reason, it is possible to use the collar ring 6 of a sufficient size for given bearing dimensions to achieve excellent durability and, also, the sealability can be secured.

Figure 2:
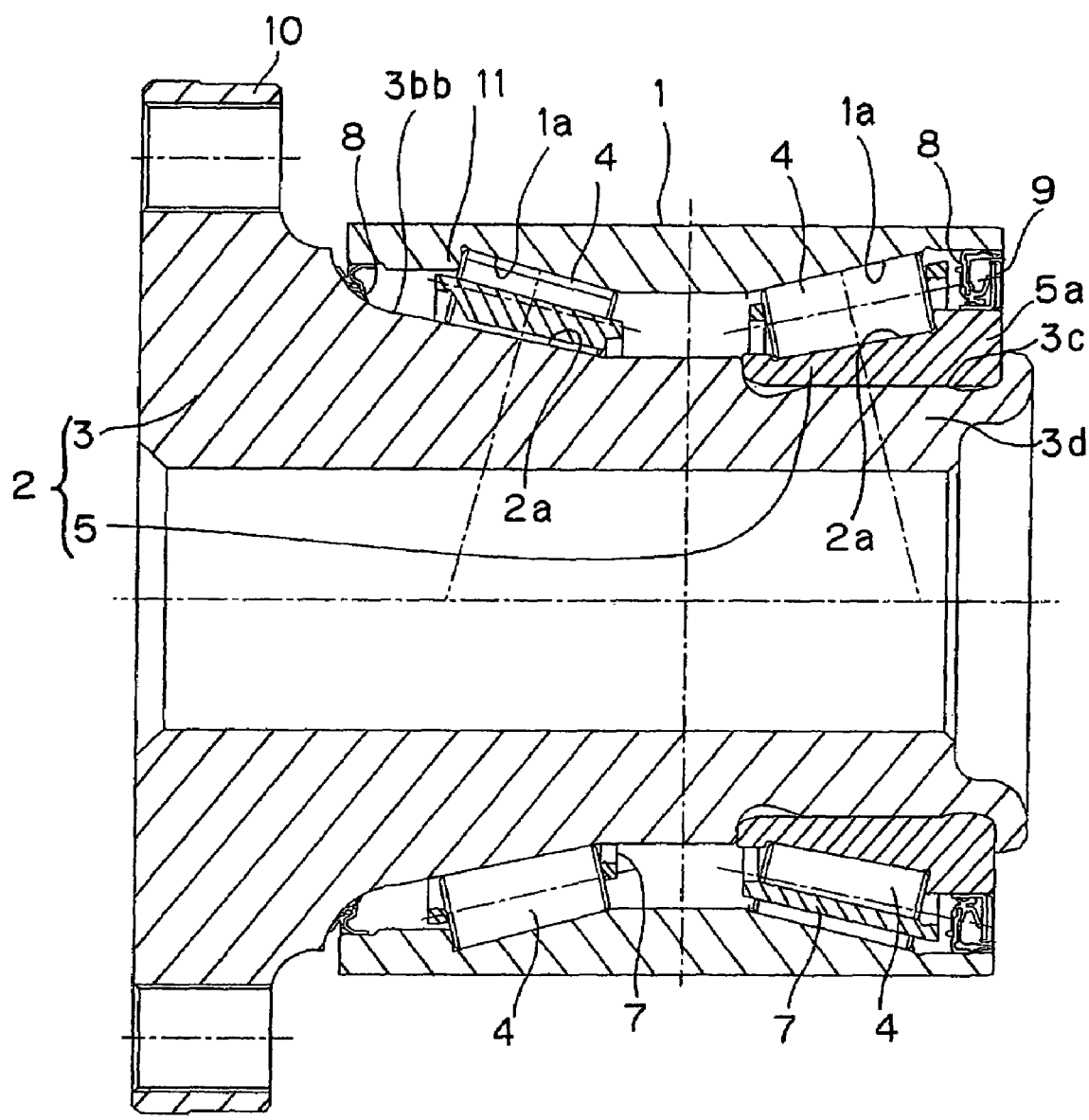
FIG. 2 is a longitudinal sectional view of the tapered roller bearing assembly for supporting a vehicle wheel according to a second preferred embodiment of the present invention.
Figure 3:
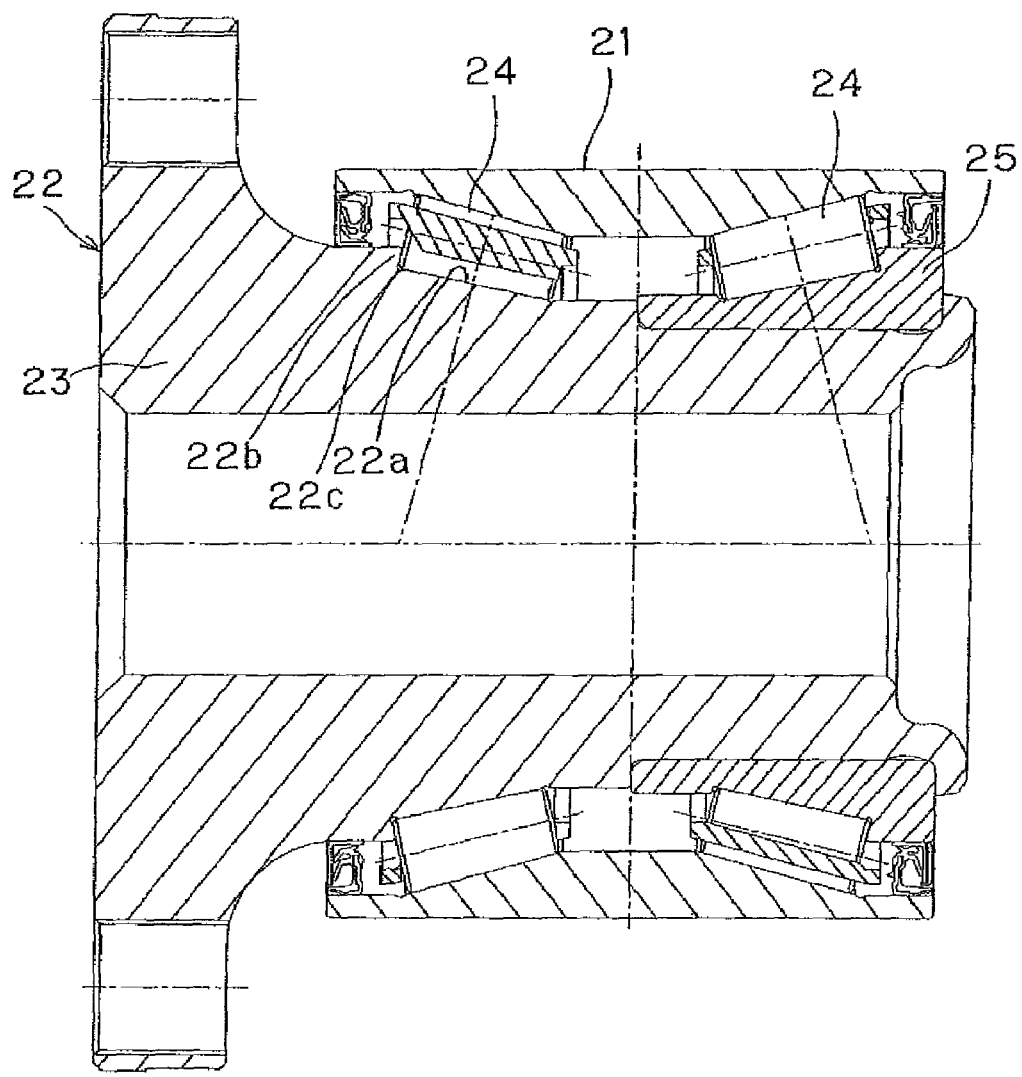
FIG. 3 is a longitudinal a sectional view of the conventional tapered roller bearing assembly.

FIG. 2 illustrates a second preferred embodiment of the present invention. This embodiment is similar to the tapered roller, wheel support bearing assembly shown in FIG. 1, except that in this embodiment the collar ring 6 which has been described as mounted on the hub axle 3 is dispensed with and, instead, a collar 11 engageable with the large diameter ends of the outboard row of the tapered roller 4 is formed on the inner periphery of the outer member 11. A portion of the outer periphery of the hub axle 3, which lies between the rolling face 2*a* for the outboard row of the tapered rollers 4 and the side face of the hub flange 10 is formed as a smooth arcuately sectioned surface area 3*bb*. The sealing member 8 secured to the inner peripheral surface of the outboard end of the outer member 1 is held in sliding engagement with the arcuately sectioned surface area 3*bb*.

Other structural features of the wheel support bearing assembly according to the second embodiment are similar to those shown and described in connection with the first embodiment.

In the case of this construction, since the large diameter ends of the outboard row of the tapered rollers 4 are held in contact with the collar 11 formed in the outer member 1, stress concentration in the hub axle 3 brought about through the outboard row of the tapered rollers 4 can be lessened to minimize the fatigue of the hub axle 3, thereby increasing the durability. Also, since that portion of the outer periphery of the hub axle 3 lying from the rolling face 2*a* for the outboard row of the tapered roller 4 to the side face of the flange 10 represents the smooth arcuately sectioned surface area 3*bb*, stress concentration at this portion by the outboard row of the tapered rollers 4 can further be lessened. It is to be noted that although the collar 11 has been shown and described as provided in the outer member 1, a problem associated with the stress concentration is minimal since the outer member 11 is on a fixed side.

What is claimed is:

1. A tapered roller bearing assembly for supporting a vehicle wheel, comprising:
   an outer member having an inner peripheral surface formed with a plurality of tapered rolling faces with their reduced diameter end sides being close to each other;
   an inner member having a corresponding number of tapered rolling faces confronting the tapered rolling faces in the outer member; and
   a corresponding number of rows of tapered rollers interposed between the tapered rolling faces in the inner member and the tapered rolling faces in the outer member, respectively,
   wherein the inner member includes a hub axle having an outer periphery formed with a hub flange defined therein at a location adjacent an outboard end of the hub axle, and a single row inner race mounted externally on an inboard end of the hub axle,
   the hub axle and the single row inner race are formed with respective rolling faces which form the plurality of rolling faces,
   the single row inner race has a large collar defined therein at a location adjacent an inboard end thereof,
   a collar ring is mounted on a portion of the outer periphery of the hub axle adjacent the hub flange for engagement with a large diameter end of each of the tapered rollers of the outboard row,
   the hub axle comprises a collar ring mounting area of a cylindrical configuration defined in a portion of the hub axle on an inboard side of the hub flange and an arcuately sectioned surface area continued from the collar ring mounting area to a side face of the hub flange,
   the collar ring includes
      a cylindrical inner peripheral surface area held in contact with the collar ring mounting area,
      an end face held in abutment with the side face of the hub flange, and
      a non-contact inner peripheral surface area defined between the end face to the cylindrical inner peripheral surface area and held in non-contact relation with the arcuately sectioned surface area,
   an outer peripheral surface of the collar ring is formed as a stepped cylindrical outer peripheral surface having a large diameter portion on one side adjacent the hub flange and a reduced diameter portion on the other side,
   the large diameter portion of the collar ring radially confronts the inner peripheral surface of the outer member to form an annular gap therebetween, and
   a sealing member fitted to an inner peripheral surface of the outer member slidably contacts with either of the reduced diameter portion or with a sealing contact ring optionally mounted on the reduced diameter portion.

2. A tapered roller bearing assembly for supporting a vehicle wheel, comprising:
   an outer member having an inner peripheral surface formed with a plurality of tapered rolling faces with their reduced diameter end sides being close to each other;
   an inner member having a corresponding number of tapered rolling faces confronting the tapered rolling faces in the outer member; and
   a corresponding number of rows of tapered rollers interposed between the tapered rolling faces in the inner member and the tapered rolling faces in the outer member, respectively,
   wherein the inner member includes a hub axle having an outer periphery formed with a hub flange defined therein at a location adjacent an outboard end of the hub axle, and a single row inner race mounted externally on an inboard end of the hub axle,
   the hub axle and the single row inner race are formed with respective rolling faces which form the plurality of rolling faces, the single row inner race has a large collar defined therein at a location adjacent an inboard end thereof, a collar engageable with the large diameter end of each of the tapered rollers of the outboard row is provided in the outer member, and a portion of the outer periphery of the hub axle, which lies between the rolling face for the outboard row of the tapered rollers and the side face of the hub flange and confronts the inner peripheral surface of the outer member, is formed as a smooth arcuately sectioned surface area, with which a sealing member secured to the inner peripheral surface of the outer member slidably contacts.

* * * * *